No. 621,465. Patented Mar. 21, 1899.
C. A. STORMS.
BICYCLE BOAT.
(Application filed Apr. 14, 1898.)
(No Model.) 2 Sheets—Sheet 2.
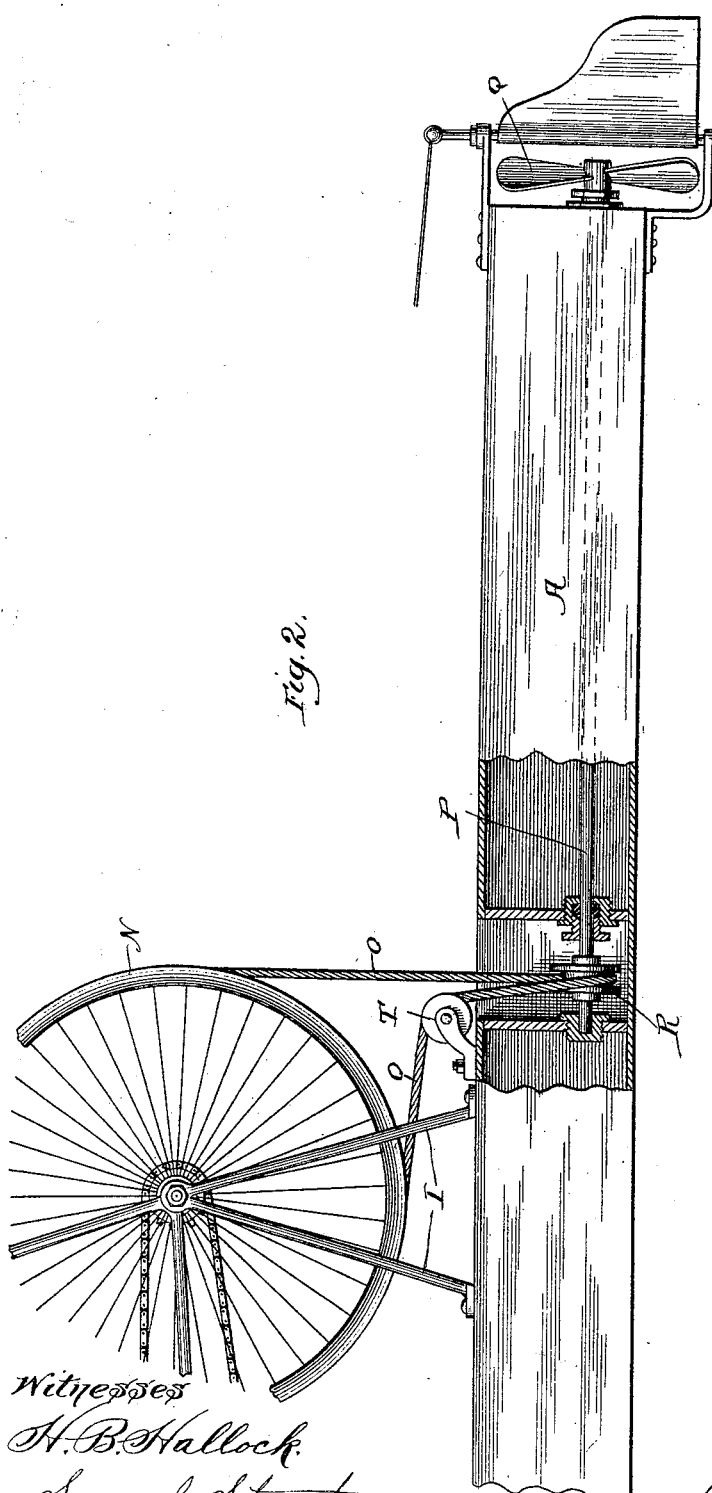
Witnesses
H. B. Hallock
Samuel Stuart
Inventor
Charles A. Storms
by ___ Attorney

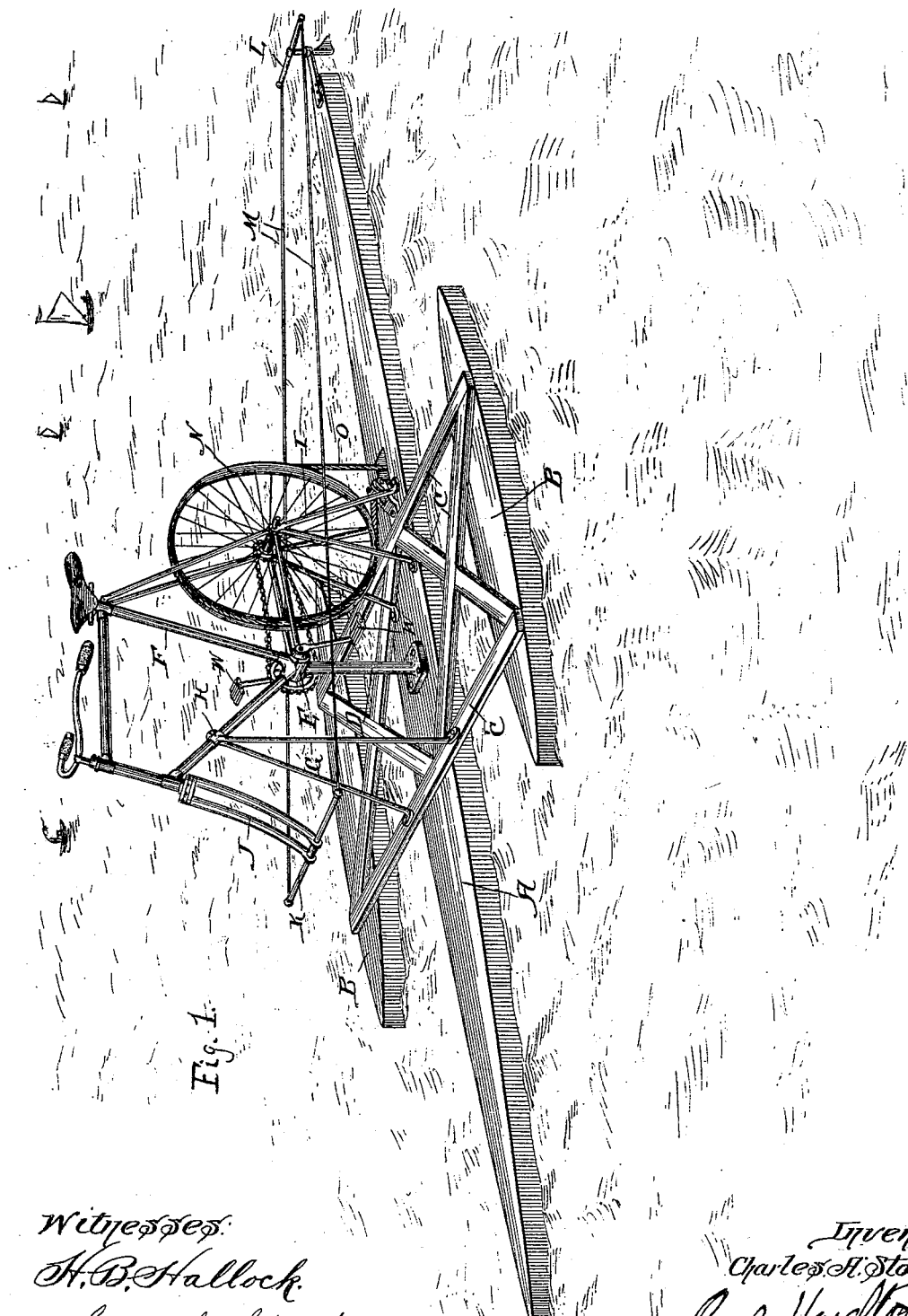

United States Patent Office.

CHARLES A. STORMS, OF BUFFALO, NEW YORK.

BICYCLE-BOAT.

SPECIFICATION forming part of Letters Patent No. 621,465, dated March 21, 1899.

Application filed April 14, 1898. Serial No. 677,549. (No model.)

*To all whom it may concern:*

Be it known that I, CHARLES A. STORMS, a citizen of the United States, residing at Buffalo, in the county of Erie and State of New York, have invented a certain new and useful Improvement in Bicycle-Boats, of which the following is a specification.

My invention relates to a new and useful improvement in bicycle-boats, and has for its object to provide an exceedingly simple and effective arrangement whereby an ordinary bicycle may be with slight change utilized for the propelling of a boat built upon the general principles of the catamaran.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a perspective of my improvement, showing a bicycle mounted upon the body and so arranged as to propel and steer the same; Fig. 2, an enlarged view of a portion of the central shell, a portion of which is broken away to illustrate the arrangement of the driving mechanism.

In carrying out my invention as herein embodied I form a boat of three shells, the central shell A being of considerable length, but of small narrow beam, while the two side shells B are much shorter in length, but of substantially the same beam, and these shells are coupled together by the framework C, so as to lie parallel with each other, but at some distance apart, the object of which arrangement is to provide for the support of the driving mechanism and rider.

Secured to the central shell, near the center thereof, is a standard D, having a socket E of semicylindrical shape at its upper end, and this is for the purpose of receiving the crank-hanger of the bicycle-frame F, as clearly shown, and this frame is further secured in place and rendered rigid relative to the boat by means of the stay-rods G, which are clamped at H to the lower front bar of the bicycle-frame, and also by the stay-rods I, which are clamped to the rear portion of the frame, as clearly shown. The front wheel of the bicycle is removed from the steering-fork J, and in place thereof a rod K is inserted and secured, this rod being connected with the tiller L by the cords or wires M, so that the handle-bars may be used for steering the body, as will be readily understood.

The tire is removed from the rear wheel N or a suitable wheel substituted for the ordinary rear wheel of the bicycle, and from this grooved wheel is run the cord or belt O for the purpose next explained.

A propeller-shaft P is journaled in suitable bearings within the central shell and has upon its rear end, which projects beyond the shell, the propeller Q, while the forward end of the shaft carries a grooved pulley R, over which the belt O runs by a quarter-twist, the pulley T serving to guide the belt over the wheel N to the pulley R, as shown in Fig. 2. From this description it will be seen that a rider mounted upon the bicycle may propel the boat by operating the pedals W, and the wheel N will then serve as a fly-wheel, as well as the means for transmitting motion to the propeller-shaft, which when revolved in the proper direction will force the boat forward or when reversed will give it a backward movement, and it is obvious that when the boat is properly constructed and arranged great speed can be had and perfect control maintained thereof.

One of the principal features of my improvement is the fact that a person having learned to ride an ordinary bicycle may without further experience manipulate my improved boat, as no oars or the like are used. It will also be noted that a boat made in accordance with my improvement is both simple and cheap in construction, and an ordinary bicycle may be used for its propelling mechanism.

Having thus fully described my invention, what I claim as new and useful is—

In combination with a boat consisting of three shells coupled together by suitable framework, a bicycle-frame suitably supported on the central shell, a rear wheel mounted in the frame and having a rim U shape in cross-section, a crank, sprocket-wheels and chain for driving the rear wheel, means connected with the front of the frame for operating the rudder, a propeller-shaft suitably journaled in the central shell, a pulley on the shaft, an idle-pulley journaled in a bracket projecting over a compartment of the shell in which the shaft-pulley operates, and a belt for the drive-wheel and pulley guided by the idle-pulley, as and for the purpose described.

In testimony whereof I have hereunto affixed my signature in the presence of two subscribing witnesses.

CHARLES A. STORMS.

Witnesses:
W. C. LAKE,
F. W. GOTTSCHALK.